United States Patent [19]

Panson et al.

[11] Patent Number: 5,171,515
[45] Date of Patent: Dec. 15, 1992

[54] PROCESS FOR INHIBITING CORROSION IN A PRESSURIZED WATER NUCLEAR REACTOR

[75] Inventors: Armand J. Panson, Pittsburgh; Carl A. Bergman, Mt. Lebanon, both of Pa.

[73] Assignee: Westinghouse Electric Corp., Pittsburgh, Pa.

[21] Appl. No.: 832,636

[22] Filed: Feb. 7, 1992

Related U.S. Application Data

[63] Continuation of Ser. No. 673,864, Mar. 21, 1991, abandoned, which is a continuation of Ser. No. 184,557, Apr. 20, 1988, abandoned.

[51] Int. Cl.$^5$ .............................................. G21C 9/00
[52] U.S. Cl. ................................................... 376/306
[58] Field of Search ...................... 376/306, 310, 313; 252/626, 631

[56] References Cited

U.S. PATENT DOCUMENTS

| | | | |
|---|---|---|---|
| 3,580,934 | 5/1971 | Murray et al. | 252/389 |
| 3,664,870 | 5/1972 | Oberhofer et al. | 134/3 |
| 3,936,583 | 2/1976 | Lloyd et al. | 428/450 |
| 4,042,456 | 8/1977 | Brown | 376/306 |
| 4,111,830 | 9/1978 | Bannister | 252/388 |
| 4,303,568 | 12/1981 | May et al. | 252/389 |
| 4,364,900 | 12/1982 | Burrill | 376/306 |
| 4,756,874 | 7/1988 | Ruiz et al. | 376/306 |
| 4,759,900 | 7/1988 | Peterson et al. | 376/306 |
| 4,950,449 | 8/1990 | Petersen et al. | 376/306 |

FOREIGN PATENT DOCUMENTS

| | | | |
|---|---|---|---|
| 0669974 | 9/1963 | Canada | 376/306 |
| 0079196 | 5/1983 | Japan | 376/306 |
| 1093996 | 5/1986 | Japan | 376/306 |
| 1095290 | 5/1986 | Japan | 376/306 |
| 2106398 | 5/1987 | Japan | 376/306 |

OTHER PUBLICATIONS

"Some Properties of Zinc and Cadmium Borates", *Russian Journal of Inorganic Chemistry*, Shchigol, Sep. 1959, pp. 913-915.
"Effect of Zinc on Corrosion Films that Form on Stainless Steel", *Corrosion*, Niedrach et al., Sep. 1986, pp. 546-549.
"Control of Radiation -Field Buildup in BWR", *EPRI NP-4072, Project 189-2*, Marble, Jun. 1985.
"The Effect of Dissolved Zinc On The Transport of Corrosion Products In PWRs", EPRI Project 2549-13, Jan. 1989.
"Experience With Gezip At Hope Creek Generating Station", Lovell et al., 1988.
"4th International Conference on Water Chemistry of Nuclear Reactor Systems", J. British Nuclear Energy Society, pp. 65-73, Apr. 1987.

*Primary Examiner*—Daniel D. Wasil
*Attorney, Agent, or Firm*—J. C. Valentine

[57] ABSTRACT

A process for inhibiting corrosion caused by the presence of coolant water passing through a pressurized water nuclear reactor by the addition of an effective amount of an aqueous solution of zinc borate to the reactor coolant water. The transport of corrosion products and radioactive cobalt ions through the reactor primary circuit, as well as levels of radioactivity within the primary circuit, are reduced.

17 Claims, 1 Drawing Sheet

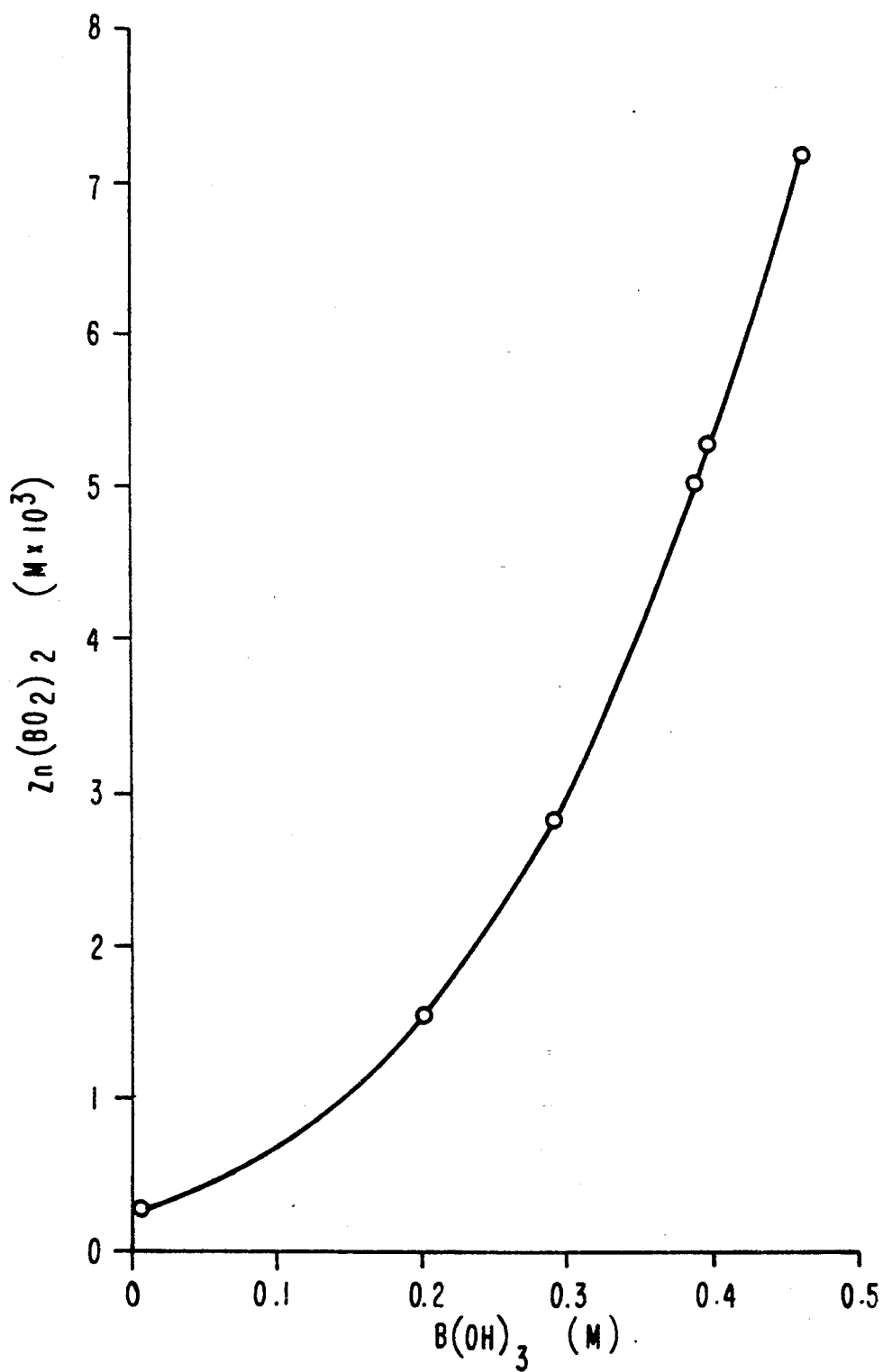

PROCESS FOR INHIBITING CORROSION IN A PRESSURIZED WATER NUCLEAR REACTOR

This application is a continuation of application Ser. No. 07/673,864 filed Mar. 21, 1991, now abandoned, which is a continuation of application Ser. No. 07/184,557 filed Apr. 20, 1988, now abandoned.

BACKGROUND OF THE INVENTION

The invention relates to a process for inhibiting corrosion in a pressurized water nuclear reactor, and more particularly for inhibiting corrosion within the primary circuit of a pressurized water nuclear reactor.

Corrosion is a particular concern for nuclear reactors in which water is present as a coolant. Several methods have been proposed to deal with the problem, including dissolving oxide scale from the structure of the nuclear reactor, as disclosed in U.S. Pat. No. 3,664,870 to Oberhofer et al. and U.S. Pat. No. 4,042,455 to Brown.

Another approach, as disclosed in U.S. Pat. No. 4,364,900 to Burrill, is to inhibit corrosion formation within the reactor system. Burrill adds from about 120 to about 200 milligrams of ammonia per kilogram of coolant water to reduce crevice corrosion in the core of pressurized water nuclear reactors.

Zinc ions are thought to inhibit corrosion within boiling water nuclear reactors, and such ions from zinc oxide and zinc chloride have been described for use in boiling water nuclear reactors.

As discussed by W. J. Marble in "Control of Radiation-Field Buildup in BWRs", *Electric Power Research Institute NP-4072, Project 189-2, Interim Report,* June 1985, zinc in the form of ZnO was used in a boiling water reactor plant. It was discussed therein that soluble zinc, by acting as a corrosion inhibitor for stainless steel, significantly reduces the amount of oxide formed on the pipes and thus the amount of Co-60 incorporated in the system. The hypothesis proposed on page 4-2 of that reference was that zinc cations normally found in zinc oxide crystals will tend to modify the normal magnetite crystal defect structure so that a more protective film is formed and corrosion significantly inhibited. Further, the presence of zinc ions in the reactor coolant water of boiling water reactors having brass tubing, as discussed at page 6-1, has been correlated with a reduced amount of corrosion and radioactive cobalt transport throughout the reactor. Zinc introduced in the form of zinc chloride ($ZnCL_2$) was also laboratory tested as a corrosion inhibitor under power plant operating conditions, as discussed by L. W. Niedrach and W. H. Stoddard in "Effect of Zinc on Corrosion Films that Form on Stainless Steel", *Corrosion* 42, 546 (1986).

The use of zinc oxide as a source of zinc ions has the drawback that zinc oxide is not particularly soluble in water, and, therefore, the zinc oxide must be added to the coolant as a slurry or suspension, rather than as a solution.

Pressurized water nuclear reactors are thermal reactors in which water is used as the coolant and as the moderator. The water is circulated by pumps throughout a primary circuit, that includes a pressure vessel, which houses the heat generating reactor core, and a plurality of flow loops. The heat absorbed by the water as it passes through the reactor core is transferred by means of a heat exchanger to a readily vaporizable liquid (water) in a secondary circuit in which the thermal energy is used to produce electricity. The water is then returned to the pressure vessel. The water in the primary circuit, which normally contains boric acid as a moderator, passes through numerous metal, generally stainless steel and Alloy 600, conduits, all of which are subject to corrosion. Further, some radioactive cobalt from the reactor core is dissolved in the water as the metal ion and transported throughout the primary circuit. The transport of radioactive cobalt throughout the primary circuit results in a level of residual radioactivity throughout the primary circuit that is not desired.

Thus, it is desired to develop a process for inhibiting corrosion in a pressurized water nuclear reactor.

An object of the invention is to provide a process for inhibiting corrosion in a nuclear reactor by the addition of zinc to the coolant water flowing therethrough in a soluble form.

SUMMARY OF THE INVENTION

The present invention provides a process for inhibiting corrosion caused by the presence of coolant water passing through a pressurized water nuclear reactor. An effective amount of an aqueous solution of zinc borate is added to the reactor coolant water. As a result of the process, the transport of corrosion products and radioactive cobalt ions through the reactor system, as well as levels of radioactivity within the reactor system, are reduced.

The aqueous solution of zinc borate is preferably an aqueous solution of zinc borate in boric acid, with the zinc borate preferably added to the reactor coolant water so that zinc ions are present in the reactor coolant water in an amount of from about 10 to about 200 parts per billion.

BRIEF DESCRIPTION OF THE DRAWING

The attached drawing illustrates the solubility of zinc borate as a function of boric acid concentration in water.

DETAILED DESCRIPTION OF THE PREFERRED EMBODIMENTS

The process of the present invention involves the addition of an effective amount of an aqueous solution of zinc borate, $Zn(BO_2)_2$, to the reactor coolant water of a pressurized water reactor. The zinc ions which are thereby added to the reactor coolant water serve to inhibit corrosion within the pressurized water nuclear reactor system, and more specifically, within the primary circuit of a pressurized water nuclear reactor system.

An advantage of using zinc borate as the source of zinc ions is that zinc borate is sufficiently soluble in water. Thus, the zinc ions can be added to the reactor coolant water as an aqueous solution, rather than as a slurry.

Preferably, the aqueous solution of zinc borate is an aqueous solution of zinc borate in aqueous boric acid. Zinc borate, as shown in the drawing is sufficiently soluble in a boric acid solution so as to provide a solution thereof for addition to the reactor coolant water. An important advantage of using an aqueous solution of zinc borate in boric acid is that boric acid is often conventionally added to the coolant water of pressurized water nuclear reactors as a neutron absorber or "chemical shim". Generally, the concentration of boric acid in the coolant water of pressurized water reactors for such a purpose is up to about 0.1 molar (M). Thus, the borate anion from the zinc borate will not introduce an additional anion to the coolant water that could serve as a corrosion accelerator, or otherwise upset the chemical balance of the reactor coolant water.

The aqueous solution of zinc borate can be prepared by adding a 0.1N (normal) zinc nitrate solution, which has been heated, to a 0.15 normal solution of borax while stirring. The resulting white flocculant precipitate is dried, washed with water, washed with alcohol, and dried again at a temperature of between about 60° C. and about 70° C., to form a fine powder which is readily dissolved in boric acid solutions. An alternative method of preparing the aqueous solution of zinc borate is to react an aqueous solution of boric acid with zinc oxide at an elevated temperature. An equal volume of a 96 percent, by weight, alcohol is added to the aqueous solution of boric acid and zinc oxide to cause the formation of a white gelatinous precipitate of the general composition $Zn(BO_2)\cdot H_2O$. These methods are described by B. M. Shchigol, in "Some Properties of Zinc and Cadmium Borates", *Russian Journal of Inorganic Chemistry*, September 1959, pp. 913 to 915. Zinc borate, identified as $Zn_3B_4O_9\cdot 5H_2O$, may also be purchased commercially from Alpha Products of Danvers, Mass.

The aqueous solution of zinc borate is preferably concentration of zinc ions in the coolant water is from about 10 to about 200 parts per billion (ppb), more preferably, from about 10 to about 50 ppb, and, most preferably, from about 10 to about 20 ppb.

EXAMPLE

Laboratory testing was carried out in a refreshed autoclave to evaluate the effect of zinc borate addition on the corrosion behavior of four materials exposed in a pressurized water reactor primary coolant environment. These four materials were 304 stainless steel, alloy 600, Alloy 690, and Zircaloy-4. The surface conditions of the specimens were similar to that in a pressurized water reactor: ground surface for the 304 stainless steel (304) the inside of a tube for Alloys 600 (600) and 690 (690), and the outside of a tube for Zircaloy-4 (Zirc-4). The refreshed autoclave system consisted of a four-liter 316 stainless steel autoclave, a 20 liter 304 stainless steel solution reservoir, a pressurizing feed pump, and a back pressure regulator. The solution reservoir was pressurized with 29 psia hydrogen gas to produce a dissolved hydrogen value of 35 cc (STP)/kg water.

Two refreshed tests were performed at 300° C. The first test had the "middle-of-life" (MOL) primary chemistry (500 ppm boron as boric acid and 1.1 ppm lithium as lithium hydroxide) and served as a reference. The second test had the MOL chemistry +100 ppb zinc as zinc borate. The initial and final solutions for each of the two tests were analyzed for lithium and boron. For the second test, analyses were performed for zinc before, during, and after the test. Zinc additions, when needed, were made shortly after the analysis to compensate for zinc depletion. The duration of each of the two tests was 300 hours.

The chemical analyses of the solutions in the two tests are as follows:

CHEMICAL ANALYSES OF SIMULATED
PWR REACTOR PRIMARY COOLANT
WITH AND WITHOUT ZINC ADDITION

| | Tests 1 and 2 - Li/B Analysis | | | | |
|---|---|---|---|---|---|
| Solution | Test | Li (ppm) | B (ppm) | pH | Cond. (S/cm) |
| Initial | 1 | 1.3 | 500 | 6.1 | 11 |
| Final | 1 | 1.1 | 500 | 6.2 | 13 |
| Initial | 2 | 1.3 | 500 | 5.8 | 10 |
| Final | 2 | 1.1 | 500 | 6.0 | 11 |

| | Test 2-Zn Analyses | | | |
|---|---|---|---|---|
| | Zn Borate | Analysis | | Calculated |
| Hrs. | Addition (mg) | MUT | AC | MUT |
| 0 | 4.8 | 92 | | 100 |
| 48 | | 78 | 15 | |
| 50 | 1.0 | | | 99 |
| 144 | | 86 | 33 | |
| 146 | 1.0 | | | 107 |
| 216 | | 102 | 38 | |
| 218 | None | | | |
| 300 | | 82 | 72 | |

Note that the zinc in the autoclave (AC) did not approach the 100 ppb test conditions until near the end of the test. On the average, the specimens were exposed to a zinc concentration of about 40 ppb. The behavior of the zinc concentrations in the autoclave and makeup tank (MUT) during the first half of the test indicates that zinc was being deposited or incorporated into the surface of the autoclave or sample specimens. As the test progressed, the rate of zinc incorporation was reduced, since the final analysis showed the concentrations in the makeup tank and autoclave were about equal.

After the 300 hour exposure, the specimens were removed from the autoclave and photographed. Scanning electron microscope photographs were also taken to determine if the zinc addition had affected the film morphology and for evidence of incorporation of zinc into the corrosion film.

Photographs of the four specimen surfaces exposed to normal and zinc added coolant showed slightly darker surfaces for 304, 600 and 690 specimens while there was not much difference between the Zirc-4 specimens. Since darker oxides on specimens exposed under the same conditions are generally thicker, the lighter oxide on the three materials suggest that the zinc borate addition has produced a thinner oxide than was produced without the addition.

As a result of the process of the invention, the corrosion within the reactor is inhibited. Thus, the transport of corrosion products and radioactive cobalt ions through the reactor, as well as levels of radioactivity within the reactor, are reduced.

We claim:

1. The process for inhibiting corrosion caused by the presence of coolant water passing through the primary circuit of a pressurized water nuclear reactor system comprising:
   adding a sufficient amount of zinc to coolant water in a primary circuit of a pressurized water reactor for increasing the concentration of zinc ions in said reactor coolant water from about 15 up to 38 parts per billion at a rate of at least about 3 parts per billion zinc ions per day.

2. The process as defined in claim 1, wherein the coolant water has a boric acid concentration of about 0.1 Molar.

3. The process as defined in claim 1, wherein the coolant water contains about 500 ppm boron.

4. The process as defined in claim 1, wherein the coolant water contains about 1.1 ppm lithium.

5. The process as defined in claim 1, wherein the coolant water contains about 35 cc (STP) dissolved hydrogen/kg water.

6. The process of claim 1, wherein zinc borate is employed as a source of zinc.

7. The process of claim 1, wherein the zinc ion concentration of the coolant water is increased up to about 72 parts per billion zinc ion.

8. The process of claim 1, wherein the zinc ion concentration of the coolant water is increased up to about 100 parts per billion zinc ion.

9. The process of claim 1, wherein the zinc ion concentration of the coolant water is increased up to about 200 parts per billion zinc ion.

10. A process for inhibiting corrosion caused by coolant water circulating in a hydraulic circuit of a nuclear reactor, comprising the steps of:

circulating coolant water in a hydraulic circuit of a nuclear reactor at a temperature of about 300° C.;

adding zinc to the coolant water in an amount sufficient for increasing the concentration of zinc ions in the coolant water from about 15 up to about 38 parts per billion at a rate of at least about 3 parts per billion zinc ions per day.

11. The process of claim 10, wherein the coolant water has a boric acid concentration of about 0.1 Molar.

12. The process of claim 10, wherein the coolant water contains about 500 ppm boron.

13. The process of claim 10, wherein the coolant water contains about 1.1 ppm lithium.

14. The process of claim 10, wherein the coolant water contains about 35 cc (STP) dissolved hydrogen/kg water.

15. The process of claim 10, wherein zinc borate is employed as a source of zinc.

16. The process of claim 10, wherein the zinc ion concentration of the coolant water is increased up to about 72 parts per billion zinc ion.

17. The process of claim 10, wherein the zinc ion concentration of the coolant water is increased up to about 100 parts per billion zinc ion.

* * * * *